United States Patent
Ha et al.

(10) Patent No.: US 8,486,584 B2
(45) Date of Patent: Jul. 16, 2013

(54) METHOD OF FABRICATING CARBON MATERIAL, CARBON MATERIAL PREPARED BY THE METHOD, CELL MATERIAL AND APPARATUS USING THE SAME

(75) Inventors: Heung Yong Ha, Seoul (KR); Han-ik Joh, Seoul (KR); Seong Mu Jo, Seoul (KR); Soo-Kil Kim, Seoul (KR); Suk-Woo Nam, Seoul (KR); In Hwan Oh, Seoul (KR); Tae Hoon Lim, Seoul (KR); Seong Ahn Hong, Seoul (KR); Sung-Yeon Jang, Daegu (KR)

(73) Assignee: Korea Institute of Science and Technology, Seoul (KR)

( * ) Notice: Subject to any disclaimer, the term of this patent is extended or adjusted under 35 U.S.C. 154(b) by 916 days.

(21) Appl. No.: 12/506,847

(22) Filed: Jul. 21, 2009

(65) Prior Publication Data

US 2010/0021794 A1   Jan. 28, 2010

(30) Foreign Application Priority Data

Jul. 23, 2008 (KR) ........................ 10-2008-0071839

(51) Int. Cl.
*H01M 4/02* (2006.01)
*H01M 10/00* (2006.01)
*D01F 9/12* (2006.01)

(52) U.S. Cl.
USPC ........ 429/523; 423/447.1; 429/122; 361/500; 502/182; 977/742

(58) Field of Classification Search
USPC   429/122, 523; 423/447.1; 361/500; 502/182; 977/742
See application file for complete search history.

(56) References Cited

U.S. PATENT DOCUMENTS

| 5,424,054 | A | 6/1995 | Bethune et al. |
|---|---|---|---|
| 5,457,343 | A | 10/1995 | Ajayan et al. |
| 5,489,477 | A | 2/1996 | Ohta et al. |
| 5,747,161 | A | 5/1998 | Iijima |
| 5,753,088 | A | 5/1998 | Olk |
| 5,830,326 | A | 11/1998 | Iijima |
| 2004/0009308 | A1 | 1/2004 | Schlaf et al. |
| 2007/0134151 | A1* | 6/2007 | Jo et al. ............ 423/448 |
| 2007/0197732 | A1* | 8/2007 | Guseva et al. ......... 525/236 |

FOREIGN PATENT DOCUMENTS

| KR | 10-0702156 B1 | 3/2007 |
|---|---|---|
| WO | WO 2005006378 A1 * | 1/2005 |
| WO | 2005/044723 A2 | 5/2005 |
| WO | WO 2005044723 A2 * | 5/2005 |

OTHER PUBLICATIONS

Joseph F. AuBuchon et al., Multibranching Carbon Nanotubes via Self-Seeded Catalysts, Nano Letters, 2006, pp. 324-328, vol. 6, No. 2.

Joesph F. AuBuchron et al., "Multiple Sharp Bendings of Carbon Nanotubes during Growth to Produce Zigzag Morphology", Nano Letters, 2004, pp. 1781-1784, vol. 4, No. 9.

* cited by examiner

*Primary Examiner* — Edu E Enin-Okut
(74) *Attorney, Agent, or Firm* — Sughrue Mion, PLLC

(57) ABSTRACT

Disclosed is a method for fabricating a carbon material, by which carbon fibers or carbon tubes, particularly branched carbon fibers or carbon tubes, are obtained via a so-called self-growing process without using external carbon sources. The carbon material obtained by the method has a large specific surface area and further includes a metal catalyst, and thus may be used in cell materials for a fuel cell or secondary battery, hydrogen storage devices, capacitors, solar cells, display panel or the like.

27 Claims, 5 Drawing Sheets

METHOD OF FABRICATING CARBON MATERIAL, CARBON MATERIAL PREPARED BY THE METHOD, CELL MATERIAL AND APPARATUS USING THE SAME

This application claims priority to Korean Patent Application No. 10-2008-0071839, filed on Jul. 23, 2008, and all the benefits accruing therefrom under 35 U.S.C. §119, the contents of which in its entirety are herein incorporated by reference.

BACKGROUND

1. Field

This disclosure relates to a method for fabricating a carbon material, a carbon material obtained thereby, and a cell material and device using the same.

2. Description of the Related Art

Carbon materials are valuable in use and are widely used in a broad range of industrial fields, including catalyst supports, electrode materials for fuel cells or secondary batteries, hydrogen storage materials, super capacitors, composite materials, solar cells and various electronic devices.

Among such carbon materials, carbon fibers or carbon tubes have received attention. Carbon fibers or carbon tubes have been studied in the fields of electrode materials for fuel cells and secondary batteries, since they have a high conductivity and large specific surface area.

Branches in the form of carbon fibers or carbon tubes (hereinafter referred to "branches") may be grown from stem carbon fibers or stem carbon tubes. Carbon fibers or carbon tubes which have the stem portion and branch portion may be referred to branched carbon fibers or branched carbon tubes.

Branched carbon fibers or branched carbon tubes may have a large specific surface area compared to carbon fibers or carbon tubes without branches due to a large number of branches.

Therefore, the branched carbon fibers or branched carbon tubes may allow metal catalyst particles to be highly supported thereon and dispersed therein. This feature of the branched carbon fibers or branched carbon tubes may be applied to the industrial fields requiring a large specific surface area, such as in the fields of catalyst supports, secondary batteries, hydrogen storage materials, capacitors such as super capacitors, composite materials, solar cells, and various electronic devices.

Methods for fabricating carbon fibers or carbon tubes may include an arc discharge process, laser ablation process, chemical vapor deposition process, etc.

For example, metal catalyst particles may be dispersed highly in silicon single crystals, silica, aluminum oxide, etc., and then carbon sources may be allowed to flow therethrough in a vapor phase so that stem carbon fibers or carbon tubes are grown.

Methods for fabricating branched carbon fibers or branched carbon tubes may be similar to the above-mentioned methods for growing stem carbon fibers or stem carbon tubes.

For example, metal catalyst particles may be dispersed on the surface of stem carbon fibers or stem carbon tubes, and then hydrocarbons functioning as carbon sources for growing branches may be injected thereto so that branches can be grown from the stem carbon fibers or stem carbon tubes at high temperature.

SUMMARY

The methods for fabricating carbon materials in the art may need complicated systems and processes, such as a vacuum system, due to the need of injection of carbon sources.

Under these circumstances, the inventors have conducted studies to develop a method for fabricating carbon materials, particularly branched carbon fibers or branched carbon tubes, with ease via a so-called self-growing process.

Therefore, in one aspect, there is provided a method for fabricating carbon materials, particularly branched carbon fibers or branched carbon tubes, via a so-called self-growing process without being provided with carbon sources from outside, while avoiding needs for complicated systems and processes.

In another aspect, there is provided a carbon material obtained by the above method.

In still another aspect, there are provided a cell material and device using the above carbon material.

According to one embodiment, the method disclosed herein includes: forming polymeric fibers or polymeric tubes using a halogenated polymer; dehalogenating the polymeric fibers or polymeric tubes partially or totally; and heat-treating the partially or totally dehalogenated polymeric fibers or polymeric tubes to obtain carbon fibers or carbon tubes, wherein at least one non-dehalogenated material selected from the remaining non-dehalogenated polymer, polymeric fibers and polymeric tubes, and a metal catalyst are used to perform self-growth of branches (i.e., branches in the form of carbon tubes or carbon tubes) from the stem carbon fibers or stem carbon tubes.

According to another embodiment, provided is a carbon material including a metal catalyst and carbon fibers or carbon tubes obtained by the method disclosed herein.

According to still another embodiment, provided are a cell material and a device, such as a hydrogen storage device, solar cell, secondary battery, display panel, or capacitor, using the carbon material disclosed herein.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Figure 1:
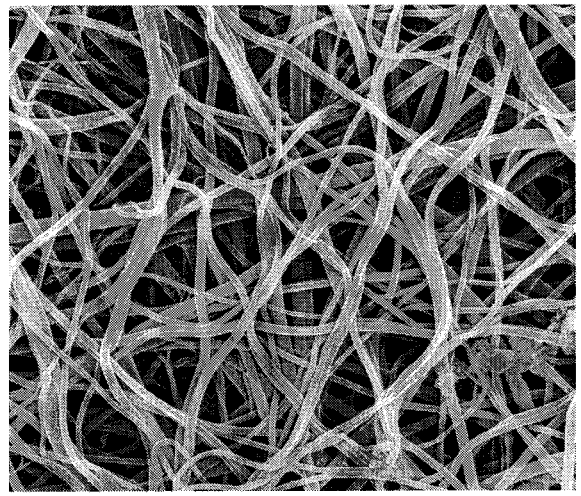
FIG. 1 is a scanning electron microscopy (SEM) image of the polymeric fibers obtained from Example.

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In example embodiments of the method disclosed herein, the method for fabricating a carbon material includes: forming polymeric fibers or polymeric tubes using a halogenated polymer; dehalogenating the polymeric fibers or polymeric tubes partially or totally; and heat treating and carbonizing the partially or totally dehalogenated polymeric fibers or polymeric tubes to obtain carbon fibers or carbon tubes, wherein at least one non-dehalogenated material selected from the remaining non-dehalogenated polymer, polymeric fibers and polymeric tubes, and a metal catalyst are used to perform self-growth of branches (i.e., branches in the form of carbon tubes or carbon tubes) from the stem carbon fibers or stem carbon tubes.

According to the above method, it is possible to fabricate branched carbon materials such as branched carbon fibers or branched carbon tubes, which include branches spontaneously grown from stem carbon materials, even without the injection of carbon sources from outside ("external carbon sources"). In this context, the method is referred to as a self-growing method, and self-growing means that branches spontaneously grow from stem carbon materials without using external carbon sources.

In one embodiment of the method disclosed herein, polymeric fibers or polymeric tubes may be obtained using a halogenated polymer as described hereinafter.

First, provided is a solution containing a metal catalyst or metal catalyst precursor and a halogenated polymer.

The metal catalyst may provide reactive sites on which carbon fibers or carbon tubes grow spontaneously, as described in more detail hereinafter.

The metal catalyst may be dispersed in the carbon fibers or carbon tubes after the preparation thereof. However, incorporation of the metal catalyst when forming the polymeric fibers or polymeric tubes may facilitate uniform dispersion of the metal catalyst in the carbon fibers or carbon tubes, and thus may avoid a need for adding the metal catalyst after the polymeric fibers or polymeric tubes are prepared.

Non-limiting examples of the metal catalyst include at least one transition metal selected from Pt, Ru, Cu, Fe, Ni, Co, Pd, W, Ir, Rh, Sr, Ce, Pr, Nd, Sm, Zr and Re; alloys thereof; at least one non-transition metal selected from Mg, B and Al; or alloys thereof. Such metal catalysts may be used alone or in combination.

The metal catalyst may have a particle size of about 1 to about 1,000 nm for the purpose of uniform dispersion.

The metal catalyst precursor may be converted into a metal catalyst through pyrolysis during the heat treatment and carbonization of the polymeric fibers or polymeric tubes, as described in more detail hereinafter. The metal catalyst precursor may be used instead of the metal catalyst. Particularly, a uniform mixture of a metal catalyst precursor solution with a halogenated polymer solution may allow high dispersion of uniform catalyst particles during the subsequent heat treatment.

Like the metal catalyst, the metal catalyst precursor may be dispersed in the polymeric fibers or polymeric tubes after the preparation thereof and before the heat treatment and carbonization thereof However, such incorporation of the metal catalyst precursor in forming the polymeric fibers or polymeric tubes may facilitate uniform dispersion of the metal catalyst particles in the carbon fibers or carbon tubes.

Non-limiting examples of the metal catalyst precursor include metal chlorides, such as $CuCl_2$, $CoCl_2$, $OsCl_3$, $CrCl_3$, $(NH_3)_6RuCl_3$, $MnCl_2$, $FeCl_3$, $NiCl_2$, $PdCl_2$, $MgCl_2$, $RuCl_3$, $H_2PtCl_6$, etc., metal nitrides, such as $Pd(NO_3)_2$, $(NH_3)_4Pt(NO_3)_2$, $Fe(NO_3)_3$, $Ni(NO_3)_2$, $Mg(NO_3)_2$, $ZrCl$ etc., iron acetylacetonate, ferrocene, and $Pt(acac)_2$. Such metal catalyst precursors may be used alone or in combination.

In one example embodiment, a halogenated polymer is used to form the polymeric fibers or polymeric tubes.

When the halogenated polymer is used in forming the polymeric fibers or polymeric tubes, the non-dehalogenated polymer remaining after the subsequent dehalogenation may be used as a starting material from which carbon fibers or carbon tubes may be formed.

Non-limiting examples of the halogenated polymer include fluoro-based homopolymers or copolymers, including polyvinylidene fluoride, poly(vinylidene fluoride-co-hexafluoropropylene), poly(vinylidene fluoride-co-trifluoroethylene) and perfluoropolymer, chloro-based homopolymers or copolymers, including polyvinyl chloride, polyvinylidene chloride, poly(vinylidene chloride-co-vinyl chloride) and saran polymer, or blends thereof.

In another example embodiment for forming polymeric fibers or polymeric tubes using a metal catalyst or metal catalyst precursor and a halogenated polymer, a solution containing the metal catalyst or metal catalyst precursor and the halogenated polymer is provided, and the solution is used to form the polymeric fibers or polymeric tubes.

To provide the solution containing the metal catalyst or metal catalyst precursor and the halogenated polymer, the metal catalyst or metal catalyst precursor may be dissolved into a solvent, such as acetone, to provide a catalyst solution, the halogenated polymer may be mixed with dimethylacetamide to provide a halogenated polymer mixture, and then the catalyst solution may be mixed with the halogenated polymer mixture, followed by agitation, to provide the solution.

At that time, 1,8-diazabicyclo[5.4.0]undec-7-ene (DBU) may be further added to the solution to carry out the subsequent dehalogenation of the polymeric fibers or polymeric tubes.

For example, at least one process selected from electrospinning, melt blowing, electroblowing, self-assembly and template processes may be used to form polymeric fibers or polymeric tubes from the metal catalyst or metal catalyst precursor and the halogenated polymer.

For reference, an electrostatic spray or electrospray phenomenon, in which a liquid is sprayed in the form of fine droplets under a high-voltage electric field above the critical voltage, may cause formation of fibers rather than fine droplets, when the liquid has high viscosity. Such fiber formation is also referred to as electrospinning or electrostatic spinning.

In another embodiment of the method disclosed herein, the polymeric fibers or polymeric tubes have a diameter of about 5 to about 3,000 nm. The polymeric fibers or polymeric tubes may have a diameter equal to or less than about 100 nm, i.e. a nano-scaled diameter to obtain carbon nanofibers or carbon nanotubes.

In still another embodiment of the method disclosed herein, the polymeric fibers or polymeric tubes may be those formed of halogenated polymers.

Since the halogenated polymers undergo a phase shift into a liquid phase at low temperature, they may lose their fiber-like or tube-like shapes when they are subjected to heat treatment and carbonization at high temperature.

Therefore, the polymeric fibers or polymeric tubes are partially or totally dehalogenated, before they are subjected to heat treatment and carbonization to obtain carbon fibers or carbon tubes. For reference, even in the case of total dehalogenation of the polymeric fibers or polymeric tubes, the halogenated polymer may still remain in the dehalogenated polymeric fibers or polymeric tubes.

In still another embodiment of the method disclosed herein, the dehalogenated polymeric fibers or polymeric tubes may be carbonized to form stems, and the remaining non-dehalogenated materials (e.g. at least one of non-dehalogenated polymeric fibers, non-dehalogenated polymeric tubes, and the halogenated polymer remaining in the dehalogenated polymeric fibers or polymeric tubes) may serve as sources for growing branches subsequently.

The dehalogenation may be carried out in the manners as described hereinafter, but is not limited thereto.

More particularly, to perform the dehalogenation, the halogenated polymeric fibers or polymeric tubes may be treated at a temperature of about 300° C. or lower under vacuum or inert gas atmosphere, before they are subjected to carbonization.

Otherwise, chemical dehalogenation of the halogenated polymeric fibers or polymeric tubes may be performed using a strong alkaline aqueous or organic solution, before the carbonization of the halogenated polymeric fibers or polymeric tubes.

Then, the polymeric fibers or polymeric tubes, partially or totally dehalogenated as described above are heat treated and carbonized to obtain carbon fibers or carbon tubes.

The heat treatment may be carried out, for example, at a temperature of about 100 to about 2,000° C. under inert gas or vacuum atmosphere. Such heat treatment may cause carbonization of the dehalogenated polymeric fibers or polymeric tubes, accompanied with graphitization thereof.

If the heat treatment temperature is lower than about 100° C., it may not be possible to perform carbonization. On the other hand, if the heat treatment temperature is higher than about 2,000° C., the polymeric fibers or polymeric tubes may be completely burned or graphitized according to the ambient condition.

The specific heat treatment temperature may be determined in the above range considering the particular shape of the carbon fibers or carbon tubes. In general, more branched carbon fibers or branched carbon tubes may be formed as the heat treatment temperature increases.

As mentioned above, the metal catalyst precursor may be pyrolyzed simultaneously with the carbonization during the heat treatment, thereby providing metal catalyst particles.

In addition, the non-dehalogenated polymer (e.g. non-dehalogenated polymeric fibers, non-dehalogenated polymeric tubes, or the halogenated polymer remaining in the dehalogenated polymeric fibers or polymeric tubes) may be pyrolyzed and gasified during the heat treatment. Under these circumstances, carbon fibers or carbon tubes may be formed from such gasified polymers on the surface of the metal catalyst particles, i.e., on the metal catalyst particles functioning as reactive sites.

The polymeric fibers containing the metal catalyst particles (including those pyrolyzed from the metal catalyst precursor) may form stem carbon fibers or stem carbon tubes, while branches are spontaneously self-grown on the metal catalyst particles from the non-dehalogenated polymer.

In the example embodiment as described above, the self-growth of branches is carried out during the heat treatment and carbonization. However, self-growth of branches may be carried out during separate heat treatment after the heat treatment and carbonization.

Meanwhile, at the time of the heat treatment and carbonization, a hydrocarbon gas, such as acetylene, ethylene or methane, may be optionally injected to the carbon fibers or carbon tubes to cause a change in size such as length of the branched carbon fibers or branched carbon tubes in addition to the self-growth.

In one embodiment of the branched carbon fibers or branched carbon tubes disclosed herein, the branched carbon fibers or branched carbon tubes may have a diameter of about 5 to about 3,000 nm. The branched carbon fibers or branched carbon tubes may have a diameter equal to or less than about 100 nm, i.e. a nano-scale size.

In one example embodiment, the branched carbon materials such as carbon fibers or carbon tubes may have a specific surface area of about 50 to about 3,000 $m^2/g$. The specific surface area may be determined via the nitrogen physisorption method as described hereinafter. In addition, the branched carbon materials may have a pore size of about 1 to about 300 nm. Branches of the branched carbon materials such as carbon fibers or carbon tubes may have a diameter of about 5 to about 1000 nm.

The branched carbon materials such as carbon fibers or carbon tubes according to one embodiment may be useful in various industrial fields requiring the use of carbon materials. Particularly, since the branched carbon materials such as carbon fibers or carbon tubes disclosed herein have a large specific surface area and high porosity and further include a metal catalyst, they may be useful for electrode catalysts or catalyst supports for fuel cells, microporous diffusion layers or hydrogen storage media. Further, the carbon materials disclosed herein may be useful as electrode materials for supercapacitors, secondary batteries, solar cells, or display panel.

The examples and experiments will now be described. The following examples and experiments are for illustrative purposes only and not intended to limit the scope of this disclosure.

Example

Fabrication of Carbon Fibers or Carbon Tubes

Formation of Polymeric Fibers or Polymeric Tubes

First, 0.25 g of a platinum precursor ($H_2PtCl$) is mixed with 7 g of acetone to provide a metal precursor solution. In a separate container, 1.27 g of polyvinylidene fluoride as a halogenated polymer is mixed with 3 g of dimethyl acetamide to provide a halogenated polymer mixture. The solution and the mixture each are agitated for about 5 minutes.

The metal precursor solution is introduced into the halogenated polymer mixture and agitated at room temperature for about 20 minutes. Then, 2.5 μL of DBU is injected into the resultant mixture to perform uniform dehalogenation, and the resultant mixture is agitated at about 70° C. for 20 minutes.

The polymer solution obtained as described above is subjected to electrospinning to obtain polymeric fibers or polymeric tubes.

The electrospinning is carried out under a polymer solution ejection rate of about 10 μL/min, with a potential difference of about 17-18 kV between the top surface and the bottom surface.

The polymeric fibers or tubes obtained via electrospinning have a diameter of about 300 nm. FIG. 1 is a scanning electron microscopy (SEM) image of the polymeric fibers obtained from Example.

Dehalogenation of Polymeric Fibers or Polymeric Tubes

The polymeric fibers or polymeric tubes obtained as described above undergo a phase shift into a liquid phase at 165° C. Thus, the polymeric fibers or polymeric tubes are dehalogenated.

The dehalogenation treatment is carried out by using a strong alkaline aqueous solution. More particularly, the dehalogenation conditions are as follows.

First, 40 g of sodium hydroxide is introduced into 1 L of distilled water, and 4 g of tetra-n-butylammonium bromide (TBAB) is added thereto as a phase transfer catalyst, followed by agitation for 20 minutes. The resultant solution is heated to 70° C. After the solution reaches 70° C., the polymeric fibers obtained from the electrospinning is introduced thereto, followed by agitation for one hour.

Heat Treatment and Carbonization of Dehalogenated Polymeric Fibers

The dehalogenated polymeric fibers are carbonized under nitrogen atmosphere. The polymeric fibers are heated from room temperature to 500° C. or 800° C. at a rate of 10° C./min, and maintained at the above temperature for two hours.

Figure 2A:
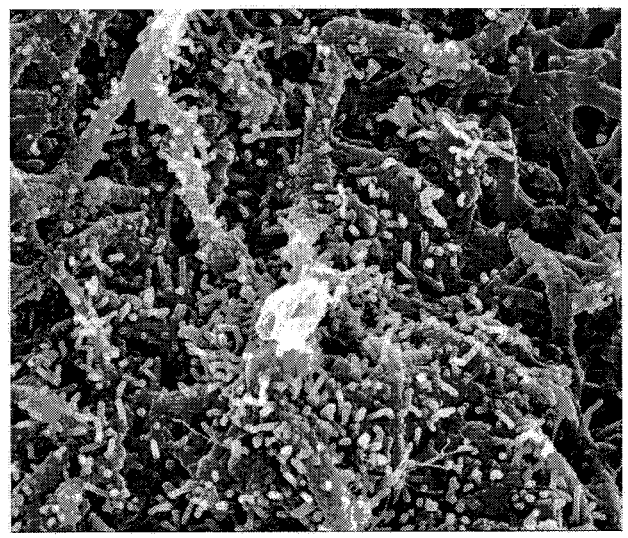
FIG. 2*a* and FIG. 2*b* are the SEM images of the carbon fibers or carbon tubes obtained from Example.
Figure 2B:
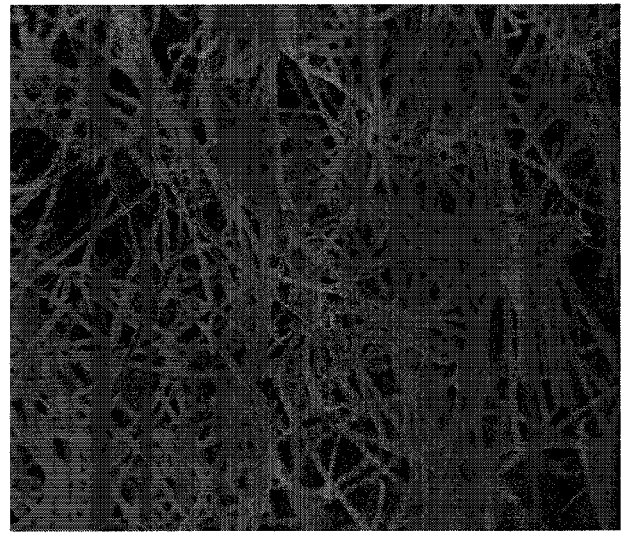

FIG. 2a and FIG. 2b are the SEM images of the carbon fibers or carbon tubes obtained from Example at different carbonization temperatures. More particularly, FIG. 2a and FIG. 2b are the SEM images of the carbon fibers or carbon tubes obtained after the carbonization at 500° C. and 800° C., respectively.

As can be seen from FIG. 2a and FIG. 2b, the carbon fibers or carbon tubes carbonized at 800° C. include more branched carbon fibers or branched carbon tubes than the carbon fibers or carbon tubes carbonized at 500° C.

Figure 3:
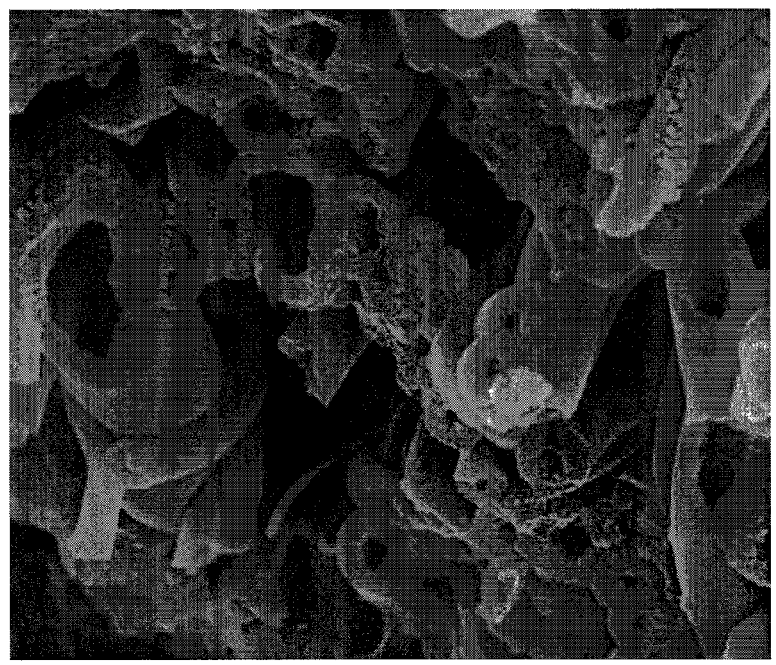
FIG. 3 is a SEM image of the cross-section of carbon tubes obtained from Example.

FIG. 3 is a SEM image of the cross-section of the carbon tubes obtained from Example, after the carbonization at 800° C.

Referring to FIG. 3, the electrospun polymeric fibers have a hollow tube-like shape. Such a tube-like shape may be formed through partial dehalogenation.

The polymeric fibers, particularly hollow tube-like polymeric fibers may still include non-dehalogenated polymer therein. The remaining halogenated polymer may be pyrolyzed under high temperature during the heat treatment, and may exist as a gaseous species. The gaseous species is adsorbed onto the surface of platinum particles formed by the pyrolysis, and serves as a starting material for the self-growth of branches.

Figure 4A:
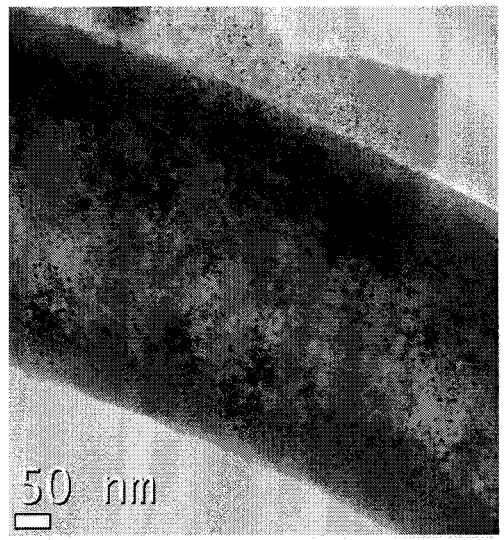
FIG. 4*a* and FIG. 4*b* are transmission electron microscopy (TEM) images of the carbon tubes obtained from Example and of platinum particles supported on the carbon tubes, respectively.
Figure 4B:
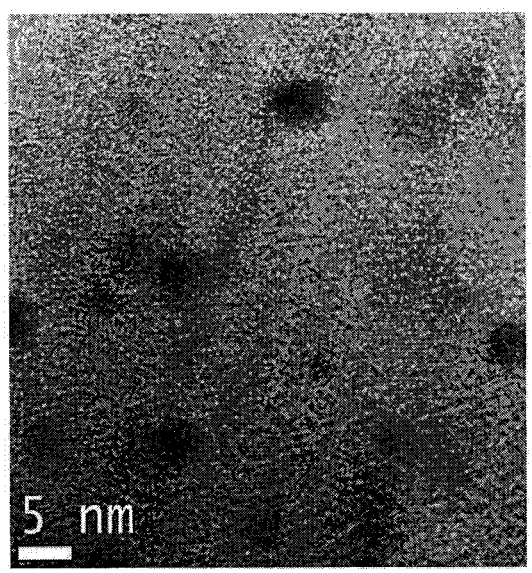

FIG. 4a and FIG. 4b are transmission electron microscopy (TEM) images of the carbon tubes obtained from Example and of platinum particles supported on the carbon tubes, respectively.

As can be seen from FIG. 4a, the platinum catalyst supported on the polymeric fibers or tubes are pyrolyzed at 500° C. and dispersed in the carbon tubes.

As can be seen from FIG. 4b, the platinum particles have a particle size of 3-4 nm despite the heat treatment at high temperature. The platinum particles having such a size may be used as a catalyst for fuel cells, or the like.

Test Example 1

Determination of Specific Surface Area of Pt and CO Resistance

To determine the specific surface area of platinum supported on the branched carbon fibers or branched carbon tubes and stem carbon fibers or stem carbon tubes obtained from Example, as well as the carbon monoxide (CO) resistance thereof, a CO adsorption/desorption test is carried out in a half cell. As a control, a commercially available platinum catalyst [10 wt % Pt/C (E-tek)] is used.

To carry out the CO adsorption/desorption test, a mixed gas of CO with argon is injected to the platinum catalysts for 20 minutes at 0.1 V [vs. saturated calomel reference electrode (SCE)] in the presence of 0.5 M sulfuric acid electrolyte, so that the platinum surfaces are saturated sufficiently with CO. Then, argon gas is injected for 40 minutes to remove the excess CO present in the electrolyte. The cycling potential ranges from −0.2412 V to 0.988 V (vs. SCE), and the cycling rate is set to 20 mV/s.

Figure 5:
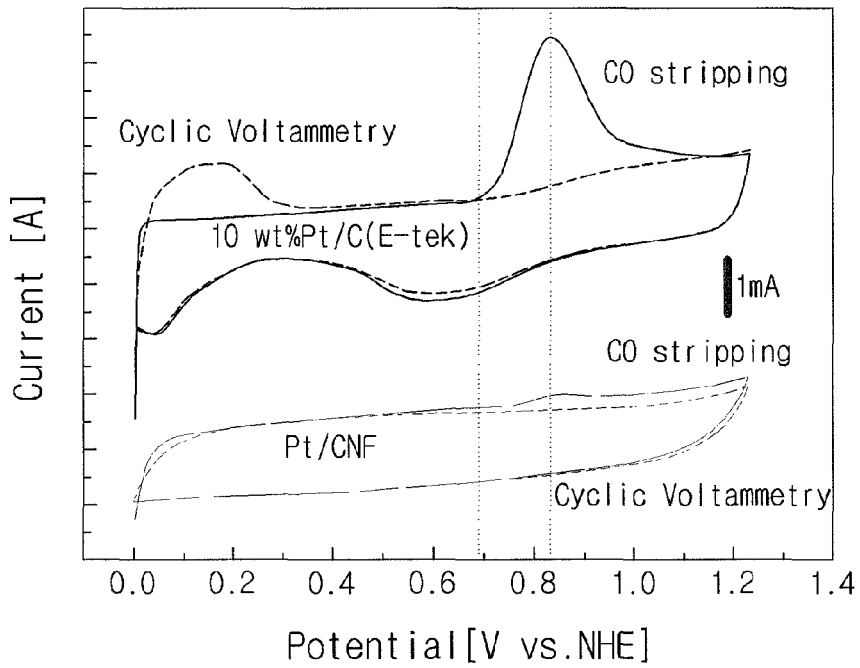
FIG. 5 is a graph showing the test results of Test Example 1.

FIG. 5 is a graph showing the electrochemical test results of Test Example 1.

The electrochemical active area ratio is obtained from the peak area ratio calculated by taking the electrical double layer charging current (current at a range of about 0.3-0.7 V in parallel with X-axis in FIG. 5) as a baseline. As can be seen from FIG. 5, the electrochemical active area of the platinum catalyst obtained from Example is about 60 times lower than that of the commercially available platinum catalyst as a control. However, it is shown that the desorption potential of CO adsorbed on the platinum surface according to Example is significantly lower than that of CO adsorbed on the commercially available platinum catalyst. This demonstrates one of the electrochemical properties, i.e., CO resistance of the platinum catalyst obtained from Example.

Test Example 2

Determination of Methanol Oxidation Characteristics

To determine the methanol oxidation activity of the platinum supported on the branched carbon fibers or branched carbon tubes and stem carbon fibers or carbon tubes, obtained from Example, a methanol oxidation test is carried out in a half cell. In the test, methanol oxidation activity per activated specific surface area of the platinum catalyst is determined. As a control, the same platinum catalyst as Test Example 1 is used. To an argon gas-purged solution containing 0.5 M sulfuric acid mixed with 1.0 M methanol, the platinum catalyst of Example and the control platinum catalyst are introduced.

Figure 6:
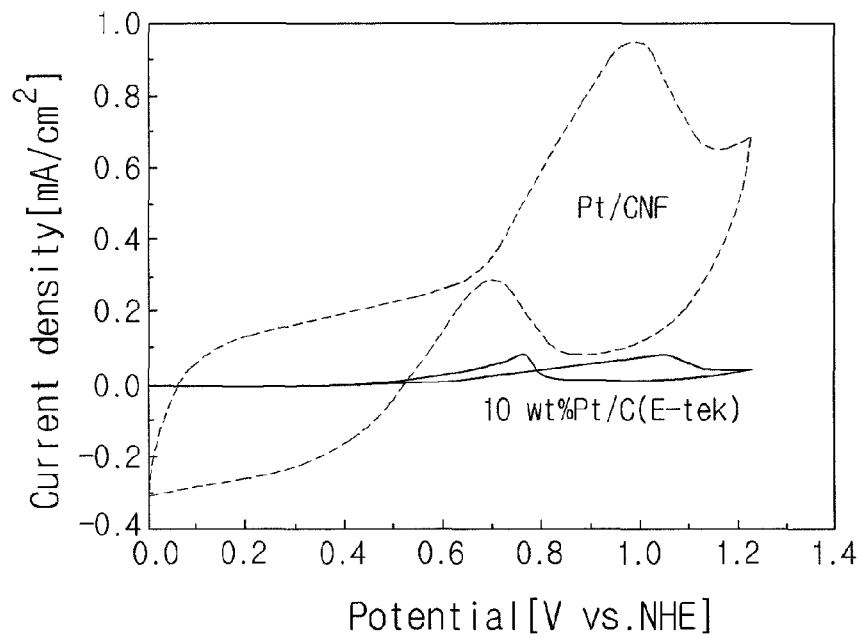
FIG. 6 is a graph showing the test results of Test Example 2.

FIG. 6 is a graph showing the test results of Test Example 2.

As can be seen from FIG. 6, in the argon gas-purged solution containing 0.5 M sulfuric acid mixed with 1.0 M methanol, the platinum catalyst of Example shows a methanol oxidation activity per specific surface area of the platinum catalyst approximately 11 times higher than the activity of the commercially available platinum catalyst.

Test Example 3

Determination of Graphitization Degree

To determine the graphitization degrees of the branched carbon fibers or branched carbon tubes and stem carbon fibers or stem carbon tubes, obtained from Example, Raman spectroscopy is carried out.

Figure 7:
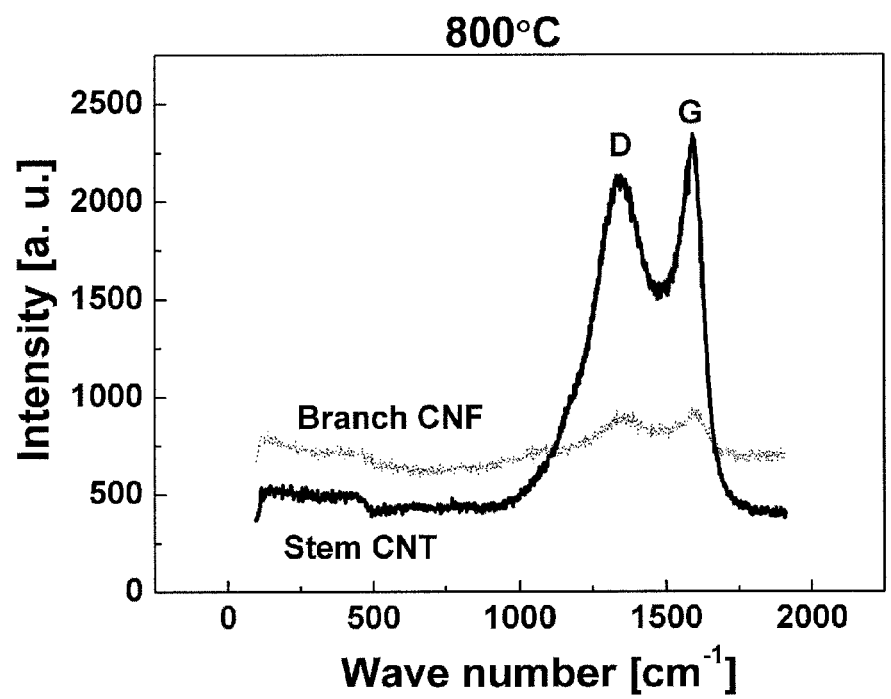
FIG. 7 is a Raman spectrum showing the results of Raman spectroscopy according to Test Example 3.

FIG. 7 is a Raman spectrum showing the test results of Raman spectroscopy according to Test Example 3.

As can be seen from FIG. 7, the ratio of G band to D band ($I_G/I_D$ ratio) of the carbon fibers or carbon tubes of Example is greater than 1. This means that the carbon fibers or carbon tubes have a higher graphitization degree as compared to carbon particles used as a fuel cell carrier.

Test Example 4

Determination of Carrier Properties

To determine the surface areas of the carbon fibers or carbon tubes obtained from Example in their use as a support, a nitrogen physisorption test is carried out. As a control, a commercially available carbon support, Vulcan XC-72R carbon black powder, is used.

Figure 8:
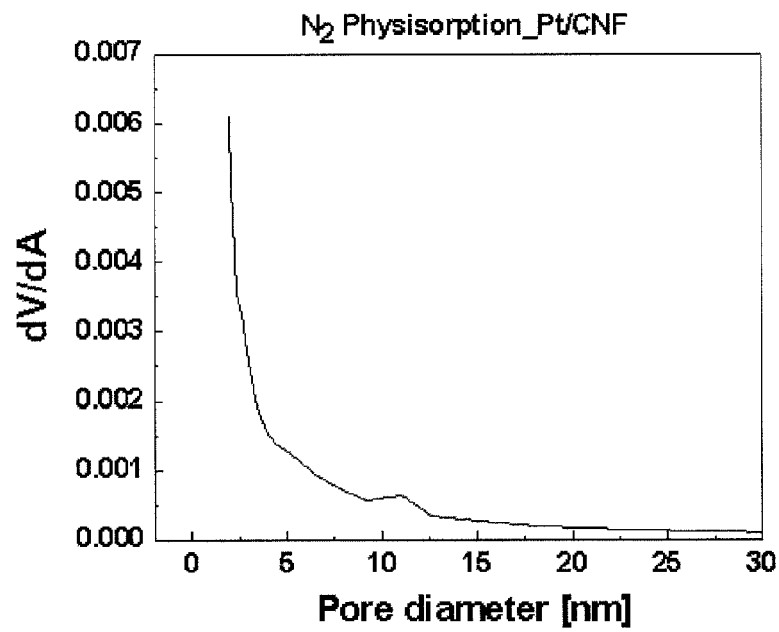
FIG. 8 is a graph showing the test results of Test Example 4.

FIG. 8 is a graph showing the test results of Test Example 4.

As can be seen from FIG. 8, the carbon fibers or carbon tubes of Example have a specific surface area of about 440 $m^2/g$. Such a large specific surface area corresponds to about 2 times of the specific surface area of a commercially available carbon powder used as a fuel cell catalyst support. This demonstrates that the carbon fibers or carbon tubes of Example allows metal particles to be highly dispersed therein and highly supported thereon, when they are used as a support for a supported catalyst.

As can be seen from the foregoing test results, such high methanol oxidation activity of the platinum catalyst supported on the carbon material obtained from Example may result from the following two factors:

First, the platinum catalyst may maintain its activated specific surface area, because methanol oxidation products may be easily removed due to its high resistance against CO.

Second, the carbonized carbon fibers or carbon tubes of Example have a higher graphitization degree than a commercially available carbon powder to facilitate movement of electrons generated from the reaction, thereby realizing a high reaction rate on the surface of an electrode.

Therefore, the carbon fibers or carbon tubes obtained from Example and platinum supported thereon are useful as electrode materials, particularly for fuel cells, secondary batteries, etc.

According to the method disclosed herein, a carbon material, particularly a branched carbon material, may be obtained with ease via a so-called self-growing process without external carbon sources. Thus, it is possible to simplify the processing steps and system. Additionally, the heat treatment at high temperature allows pyrolysis of any metal precursors present in the polymeric nanofibers or nanotubes, so that they may be used directly as metal catalysts. Such metal catalysts may be prevented from metal particle sintering even at high temperature. The carbon material, particularly branched carbon fibers or branched carbon tubes, obtained from the above method has a large specific surface area, resulting in an increase in activity of the carbon fibers or carbon tubes.

The carbon material obtained by the method disclosed herein may be applied to various industrial fields requiring carbon materials. In addition, the carbon material further includes a metal catalyst, and thus may be used favorably in cell materials for a fuel cell or secondary battery, hydrogen storage devices, capacitors, etc.

While the exemplary embodiments have been shown and described, it will be understood by those skilled in the art that various changes in form and details may be made thereto without departing from the spirit and scope of this disclosure as defined by the appended claims.

In addition, many modifications can be made to adapt a particular situation or material to the teachings of this disclosure without departing from the essential scope thereof Therefore, it is intended that this disclosure not be limited to the particular exemplary embodiments disclosed as the best mode contemplated for carrying out this disclosure, but that this disclosure will include all embodiments falling within the scope of the appended claims.

What is claimed is:

1. A method for fabricating a carbon material, which comprises:
    forming polymeric fibers from a halogenated polymer;
    subjecting the polymeric fibers to partial dehalogenation to give a partial dehalogenation product comprising dehalogenated polymeric fibers and a non-dehalogenated polymer in the dehalogenated polymeric fibers; and
    heat-treating the partial dehalogenation product in the presence of a metal catalyst or metal catalyst precursor to obtain carbon tubes,
    wherein the non-dehalogenated polymers are pyrolyzed and gasified during the heat treatment and adsorbed onto the metal catalyst or metal catalyst precursor present in the carbon tubes or in the dehalogenated polymeric fibers; and
    wherein branches are self-grown from the carbon tubes at a location where the metal catalyst or metal catalyst precursor to which the pyrolyzed and gasified non-dehalogenated polymers are adsorbed is present.

2. The method for fabricating a carbon material according to claim 1, wherein the forming of polymeric fibers is conducted in the presence of a metal catalyst or metal catalyst precursor, and wherein the metal catalyst or metal catalyst precursor used in the heat-treatment of the partial dehalogenation product are the same as the metal catalyst or metal catalyst precursor used in the formation of polymer fibers.

3. The method for fabricating a carbon material according to claim 1, wherein the heat-treatment comprises two-step heat treatments.

4. The method for fabricating a carbon material according to claim 2, wherein the metal catalyst is formed by pyrolysis of the metal catalyst precursor.

5. The method for fabricating a carbon material according to claim 2, wherein the forming of the polymeric fibers is conducted in a solution containing the metal catalyst or metal catalyst precursor and the halogenated polymer.

6. The method for fabricating a carbon material according to claim 5, wherein the solution further comprises 1,8-diazabicyclo[5.4.0]undec-7-ene (DBU).

7. The method for fabricating a carbon material according to claim 1, wherein the heat treatment of the partial dehydrogenation product includes carbonizing the polymeric fibers with graphitization at a temperature of about 100° C. to about 2,000° C. under inert gas or vacuum atmosphere.

8. The method for fabricating a carbon material according to claim 1, wherein a hydrocarbon gas is further injected during the heat treatment to cause a change in size of the branched carbon tubes.

9. The method for fabricating a carbon material according to claim 1, wherein the metal catalyst comprises at least one transition metal selected from the group consisting of Pt, Ru, Cu, Fe, Ni, Co, Pd, W, Ir, Rh, Sr, Ce, Pr, Nd, Sm, Zr and Re; an alloy thereof; at least one non-transition metal selected from the group consisting of Mg, B and Al; or an alloy thereof.

10. The method for fabricating a carbon material according to claim 2, wherein the metal catalyst precursor comprises at least one selected from the group consisting of metal chloride, metal nitride, iron acetylacetonate, ferrocene and platinum acetylacetonate.

11. The method for fabricating a carbon material according to claim 10, wherein the metal chloride comprises at least one selected from the group of $CuCl_2$, $CoCl_2$, $OsCl_3$, $CrCl_3$, $(NH_3)_6RuCl_3$, $MnCl_2$, $FeCl_3$, $NiCl_2$, $PdCl_2$, $MgCl_2$, $RuCl_3$ and $H_2PtCl_6$.

12. The method for fabricating a carbon material according to claim 10, wherein the metal nitride comprises at least one selected from the group of $Pd(NO_3)_2$, $(NH_3)_4Pt(NO_3)_2$, $Fe(NO_3)_3$, $Ni(NO_3)_2$, $Mg(NO_3)_2$ and $ZrCl_4$.

13. The method for fabricating a carbon material according to claim 1, wherein the halogenated polymer comprises fluoro-based homopolymers or copolymers comprising at least one selected from the group consisting of polyvinylidene fluoride, poly(vinylidene fluoride-co hexafluoropropylene), poly(vinylidene fluoride-co-trifluoroethylene) and perfluoropolymer; chloro-based homopolymers or copolymers comprising at least one selected from the group consisting of polyvinyl chloride, polyvinylidene chloride, poly (vinylidene chloride-co-vinyl chloride) and saran polymer; or any mixture thereof.

14. The method for fabricating a carbon material according to claim 1, wherein the polymeric fibers have a diameter of about 5 to about 3,000 nm.

15. A carbon material obtained by the method as defined in claim 1, which comprises a metal catalyst, and branched carbon tubes.

16. The carbon material according to claim 15, wherein the branched carbon tubes comprise the metal catalyst particles dispersed in stem carbon tubes, and branches self-grown on the metal catalyst particles.

17. The carbon material according to claim 15, wherein the branched carbon tubes have a specific surface area of about 50 to about 3,000 $m^2/g$.

18. The carbon material according to claim 15, wherein the branched carbon tubes have a diameter of about 5 to about 3,000 nm.

19. The carbon material according to claim 15, wherein the branched carbon tubes have a pore size of about 1 to about 300 nm.

20. The carbon material according to claim 15, wherein the branches of the branched carbon tubes have a diameter of about 5 to about 1000nm.

21. A cell material comprising the carbon material as defined in claim 15.

22. The cell material according to claim 21, wherein the metal catalyst is used as an electrode catalyst for a fuel cell, and the branched carbon tubes are used as an electrode catalyst support for a fuel cell.

23. The cell material according to claim 21, wherein the carbon material is used as a microporous diffusion layer for a fuel cell.

24. The cell material according to claim 21, wherein the carbon material is used as a material for a secondary battery.

25. A capacitor using the carbon material as defined in claim 15.

26. The capacitor according to claim 25, wherein the capacitor is a supercapacitor.

27. A hydrogen storage device using the carbon material as defined in claim 15.

* * * * *